(12) United States Patent
Rauhala et al.

(10) Patent No.: US 12,382,243 B2
(45) Date of Patent: Aug. 5, 2025

(54) METHOD AND APPARATUS FOR A REGION DISCOVERY SERVICE

(71) Applicant: HERE GLOBAL B.V., Eindhoven (NL)

(72) Inventors: Petri Rauhala, Tampere (FI); Mikko Blomqvist, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 403 days.

(21) Appl. No.: 18/074,500

(22) Filed: Dec. 4, 2022

(65) Prior Publication Data

US 2024/0187818 A1 Jun. 6, 2024

(51) Int. Cl.
  *H04W 4/021* (2018.01)
(52) U.S. Cl.
  CPC ................. *H04W 4/021* (2013.01)
(58) Field of Classification Search
  CPC ..... H04W 4/021; H04W 12/06; H04W 4/029; H04W 4/02; H04W 12/08; H04W 64/00; H04W 4/80; H04W 12/069; H04W 4/12; H04W 12/03; H04W 12/63; H04W 64/003; H04W 8/005; H04W 4/024; H04W 48/14; H04W 40/20; H04W 4/21; H04W 4/026; H04W 36/0061; H04W 36/008375; G01S 19/05; G01S 19/42
  See application file for complete search history.

(56) References Cited

U.S. PATENT DOCUMENTS

| 2011/0163873 | A1 | 7/2011 | McIntosh |
| 2017/0280295 | A1* | 9/2017 | Tan ........................ H04W 48/18 |
| 2022/0150812 | A1 | 5/2022 | Lin et al. |

FOREIGN PATENT DOCUMENTS

WO WO-2022070140 A1 * 4/2022

* cited by examiner

*Primary Examiner* — Diane D Mizrahi
*Assistant Examiner* — Jing Gao
(74) *Attorney, Agent, or Firm* — Jeffrey R. Moisan; HERE GLOBAL B.V.

(57) ABSTRACT

A system, method, etc. for providing a geopolitical region discovery service comprising obtaining an indication of at least a first location an end user device; wherein the indication of a first location is obtained at a predefined time interval, obtaining geopolitical compliance data for one or more geopolitical areas proximate to the first location of the end user device, determining a geopolitical interaction indicator based, at least in part, on the obtained indication of first location and geopolitical compliance data for one or more geopolitical areas proximate to the first location; and, generating at least one feedback for an end user device or software client.

18 Claims, 8 Drawing Sheets

METHOD AND APPARATUS FOR A REGION DISCOVERY SERVICE

TECHNOLOGICAL FIELD

An example embodiment relates generally to a method, apparatus, computer readable storage medium, user interface and computer program product for determining geopolitical areas and, more particularly, for determining the probability of interacting with a geopolitical area based upon various types of end user data and adjusting one or more device or software settings in response.

BACKGROUND

There are many countries, states, regions, and/or country unions which regulate the transfer of "important or sensitive information" within and across their borders. For example, the EU and USA have different data privacy standards. Such regulations may prevent the transfer of information or may require acquisition of adequate permissions from authorities to do so. Such regulations may also require reporting of such activities to the relevant authorities. Such data might include personal data such as healthcare data or may be work product, infrastructure related data, or even national security related data (or other sensitive, important data). Examples of such data are the authentication credentials to connect to a service, or location of a device or end user.

Many providers of hosted services (ISPs, etc.) who handle said important or sensitive information still desire their services to be globally accessible. To comply with restrictions (when they exist) and especially when a cross-border or foreign transfer of regulated information is prevented, service providers often choose to make region specific service deployments which are then hosted within each respective region.

When such isolated deployments are created as a work around, applications need to understand how to connect to the correct hosted solution based on the geopolitical region where the device currently resides or is approaching. To make the selection of hosted service, encryption standard, etc. to utilize in each area, the application(s) and/or the mobile device running them needs a way to detect the geopolitical region(s) proximate to the device's current location.

In this situation, it is not possible to simply use a traditional GeoDNS (Geographical Domain Name System), where the GeoDNS service returns IP address pointing to a service endpoint in the current region and then the mobile device establishes a connection, because every region has unique credentials. Thus, the mobile applications and/or device needs to be able to select and use credentials which match with a regional service endpoint when required or preferred.

BRIEF SUMMARY

A method, apparatus, computer readable storage medium, user interface, and computer program product are provided in accordance with an example embodiment to determine and predict the probability a given end user will interact with a geopolitical area and, if there is an interaction, generate one or more forms of feedback including selection of the appropriate credentials and/or service endpoint to use in a given geopolitical area.

In this regard, the method, apparatus, computer readable storage medium, and computer program product of an example embodiment may provide a geopolitical region discovery service (RDS) comprising obtaining an indication of at least a first location an end user and/or end user device; wherein the indication of a first location is obtained at a predefined time interval or another event; obtaining geopolitical compliance data for one or more geopolitical areas proximate to the first location of the end user or device; determining a geopolitical interaction indicator based, at least in part, on the obtained indication of first location and geopolitical compliance data for one or more geopolitical areas proximate to the first location; and generating at least one feedback for an end user device or software client. The first location of an end user may also be captured at a dynamic time interval based on end user appointment data. The geopolitical interaction indicator determination may also additionally be based on end user driving profile data and/or end user appointment data. This data and other data may be used to update one or more databases, etc. The first location of an end user may also be obtained from the content of least one electronic communication, a mobile country code, and/or a Geographical Domain Name System (GDNS).

The feedback generated may, in some embodiments, be in the form of an alert and/or route guidance in response to the determined indicator. The feedback may also be used to select appropriate regional credentials and/or the correct geological regional service endpoint.

All this information/feedback may be displayed on an end user device (e.g., smartphone, tablet, etc.) and/or in a motor vehicle (e.g., upon a built-in vehicle display).

In other embodiments, a UI may be provided which displays in real-time the appropriate credentials to be used in a list format or as numerical scores or another visual element of the UI. User's may also manually select the credentials, etc. from this list.

Also, a computer program product may be provided. For example, a computer program product comprising instructions which, when the program is executed by a computer, cause the computer to carry out the steps described herein.

In yet another aspect, disclosed is an apparatus and/or non-transitory computer readable medium having stored thereon instructions executable by processor(s) to cause an apparatus to perform operations described herein, such as any of those set forth in the disclosed method(s), among others.

In yet another aspect, disclosed is a computer program product including instructions which, when the program is executed by a computer, cause the computer to carry out the steps described herein, such as any of those set forth in the disclosed method(s). In other words, the computer program product may have computer-executable program code portions stored therein, the computer-executable program code portions including program code instructions configured to perform any operations set forth in any of the method(s) disclosed herein, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein. None of the examples shown or discussed herein are limiting on any aspect of the claimed subject matter.

BRIEF DESCRIPTION OF THE DRAWINGS

Figure 1:
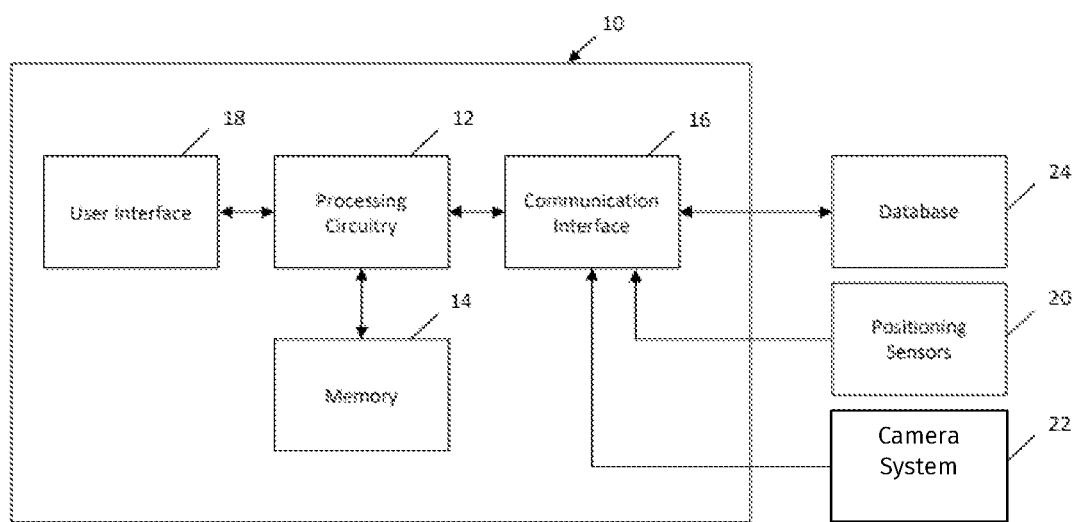
Figure 2:
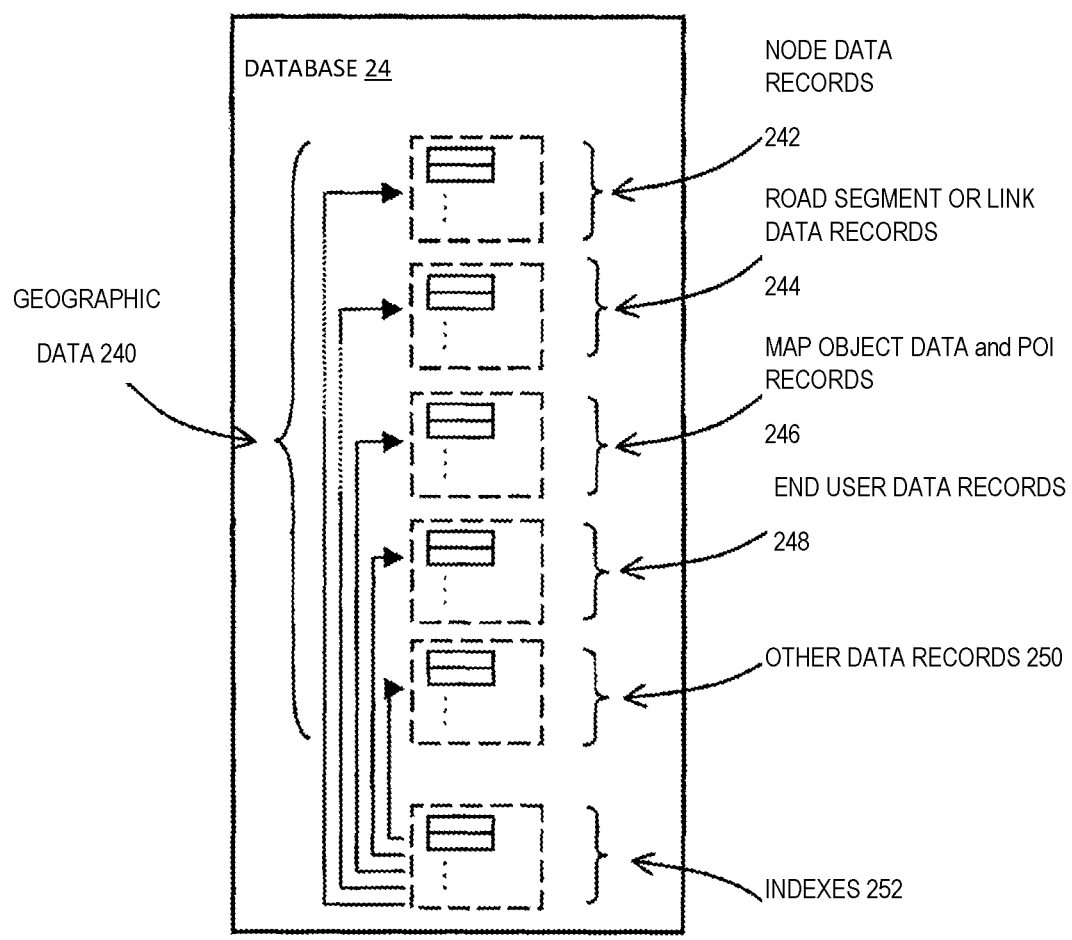
Figure 3A:
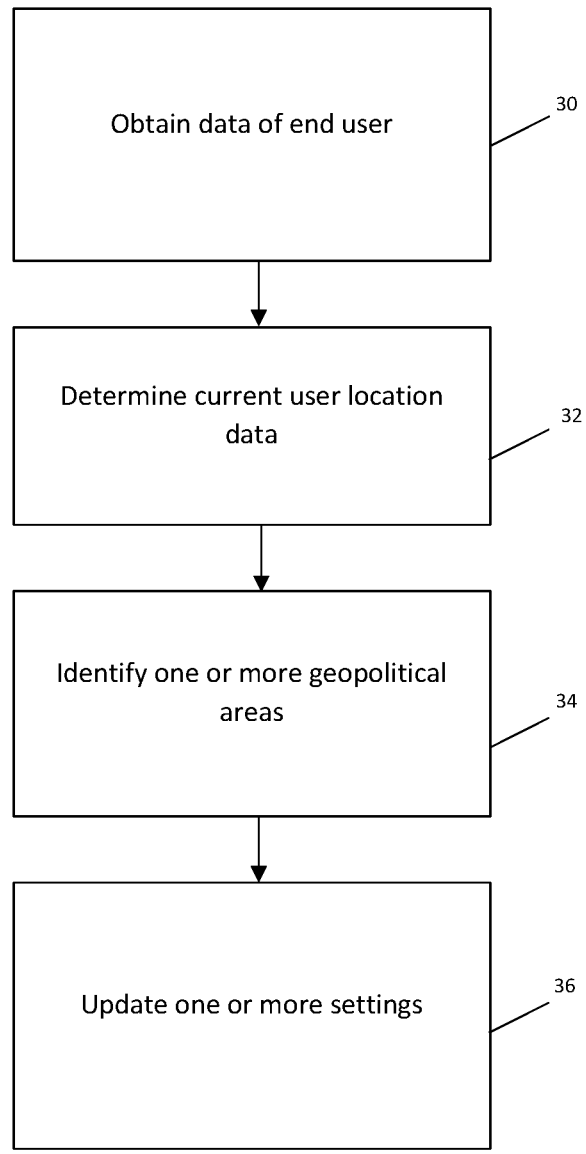
Figure 3B:
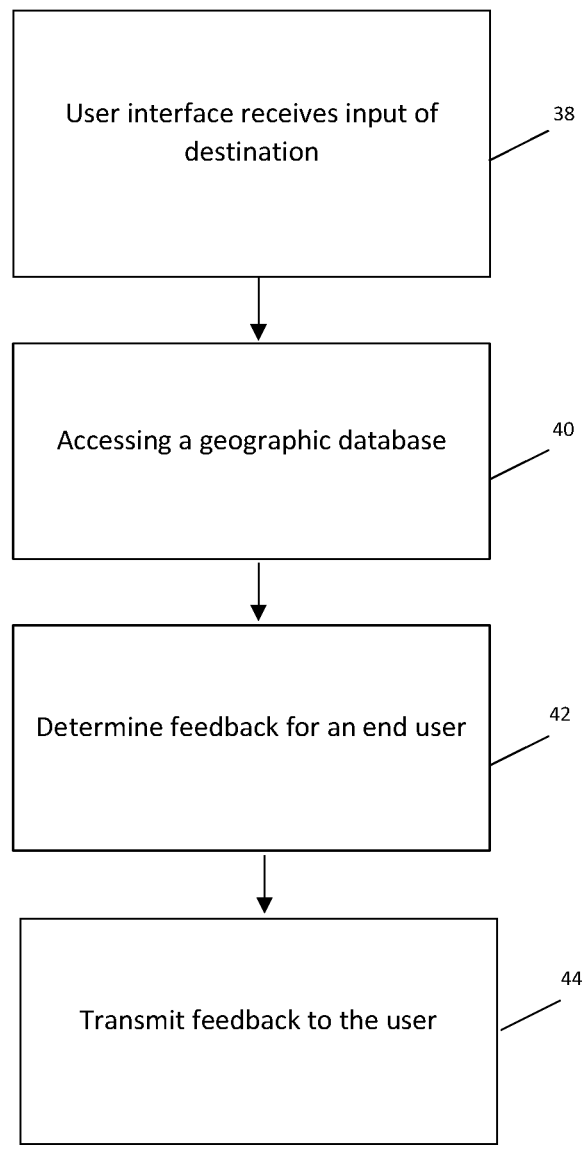
Figure 3C:
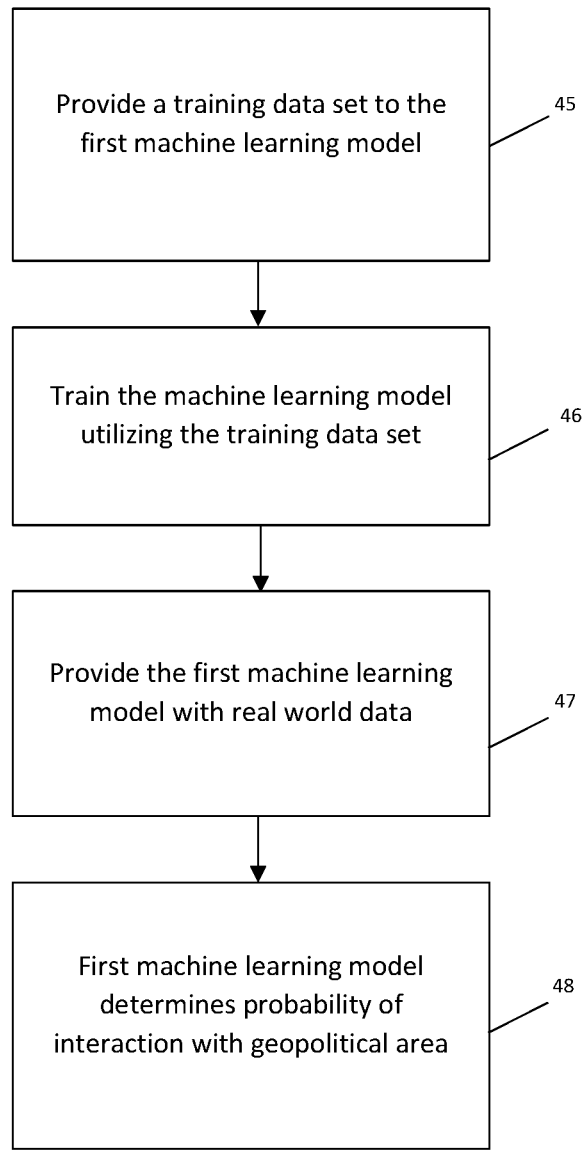
Figure 4A:
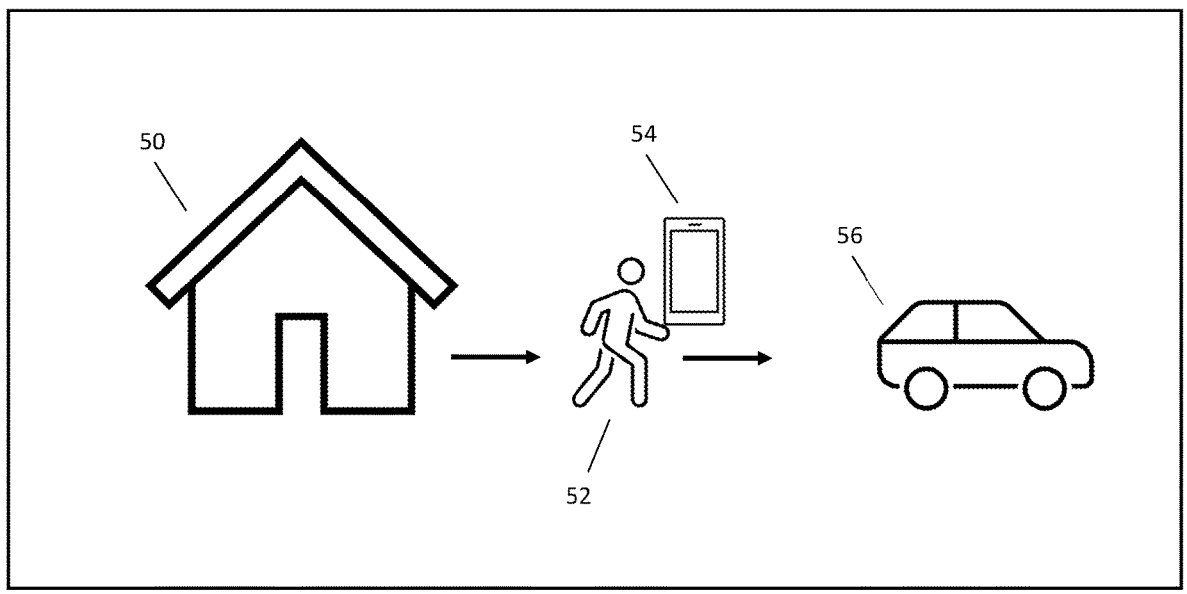
Figure 4B:
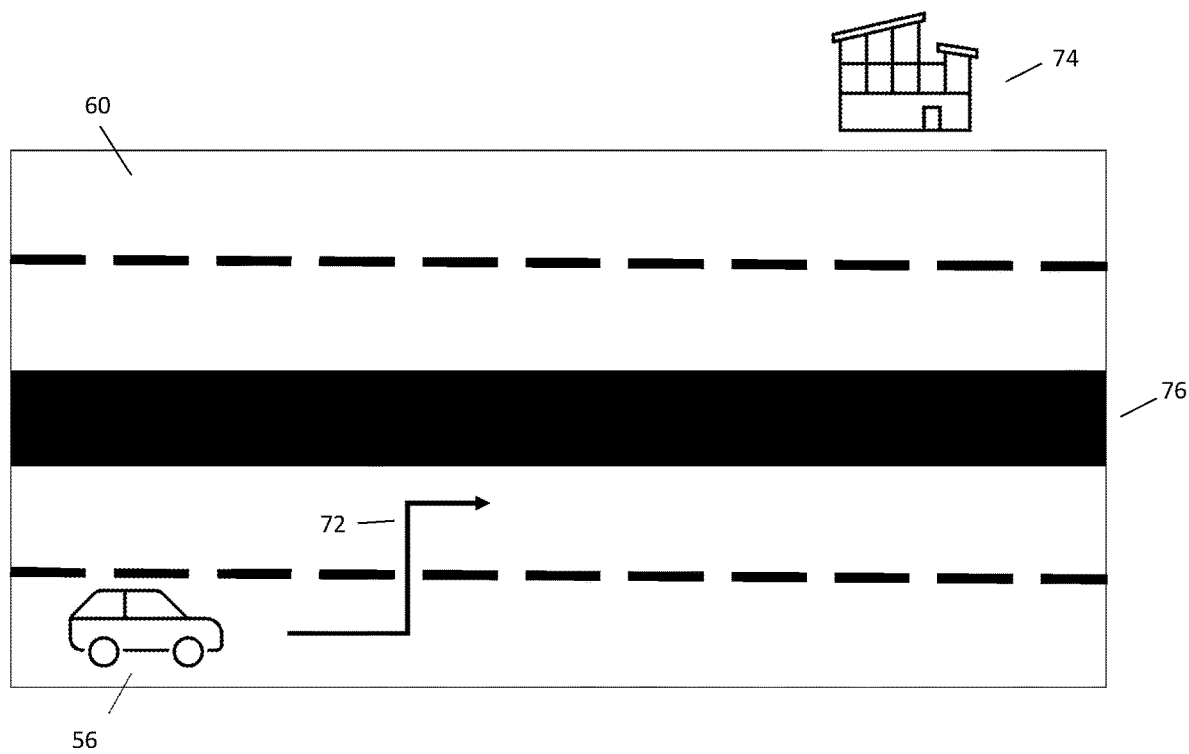
Figure 5A:
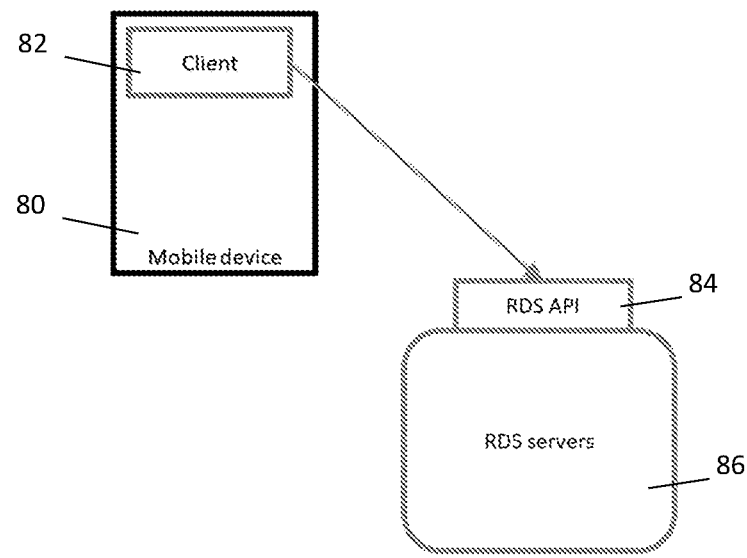
Figure 5B:
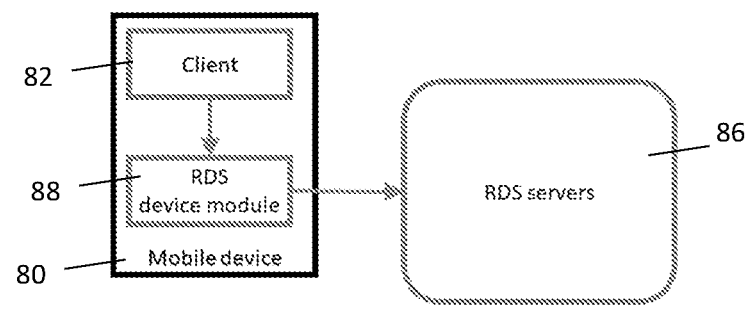

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment;

FIG. 2 is a block diagram of a geographic database of an example embodiment of the apparatus;

FIG. 3A is a flowchart illustrating the operations performed, such as by the apparatus of FIG. 1, in order for an apparatus;

FIG. 3B is a flowchart illustrating the operations performed, such as by the apparatus of FIG. 1, in order to provide a graphical user interface and/or functions thereof;

FIG. 3C is a flowchart illustrating the operations performed, such as by the apparatus of FIG. 1, in order to train machine learning models;

FIG. 4A is a graphical representation of an end user exiting their home and approaching their vehicle while using the apparatus;

FIG. 4B is a graphical representation of a road upon which a passenger car is present and the apparatus is in use;

FIG. 5A is a diagram of components of one embodiment of an RDS;

FIG. 5B is a diagram of components of another embodiment of an RDS.

DETAILED DESCRIPTION

Some embodiments of the present invention will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A system, method, apparatus, user interface, and computer program product are provided as example embodiments to provide a region discovery service based on various data sources. In order to provide such a service, the system, method, apparatus, non-transitory computer-readable storage medium, and computer program product of an example embodiment may be configured to obtain an indication of at least a first location an end user, wherein the indication of a first location is obtained at a predefined time interval, obtaining geopolitical compliance data for one or more geopolitical areas proximate to the first location of the end user, determining a geopolitical interaction indicator based, at least in part, on the obtained indication of first location and geopolitical compliance data for one or more geopolitical areas proximate to the first location; and generating at least one feedback for an end user or software client. This feedback may then be used to select appropriate credentials for use when connecting to a hosted website, application, etc. and/or update one or more databases.

The system, apparatus, method, etc. described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, etc. configured to detect and predict appointment attendance may similarly be embodied by the same or different server, computer workstation, distributed network of computing devices, personal computer, or other type of computing device.

Alternatively, the system, etc. may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

Regardless of the manner in which the system, apparatus, etc. is embodied, however, an apparatus 10 includes, is associated with, or is in communication with processing circuitry 12, memory 14, a communication interface 16 and optionally a user interface 18 as shown in FIG. 1. In some embodiments, the processing circuitry (and/or co-processors or any other processors assisting or otherwise associated with the processing circuitry) can be in communication with the memory via a bus for passing information among components of the apparatus. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally, or alternatively, the memory can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally, or alternatively, the processing circuitry can include one or more processors configured in tandem via the bus to enable independent execution of instructions, pipelining and/or multithreading.

In an example embodiment, the processing circuitry 12 can be configured to execute instructions stored in the memory 14 or otherwise accessible to the processing circuitry. Alternatively, or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 10 of an example embodiment can also include the communication interface 16 that can be any means such as a device or circuitry embodied in either hardware or a combination of hardware and software that is configured to receive and/or transmit data from/to other electronic devices in communication with the apparatus, such as a database 24 which, in one embodiment, comprises a map database that stores data (e.g., one or more map objects, POI data, etc.) generated and/or employed by the processing circuitry 12. Additionally, or alternatively, the communication interface can be configured to communicate in accordance with various wireless protocols including Global System for Mobile Communications (GSM)™, such as but not limited to Long Term Evolution (LTE)™, 3G™, 4G™, 5G™, 6G™, etc. In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally, or alternatively, the communication interface can include the circuitry for interacting with the antenna(s) to cause transmission of signals via the antenna(s) or to handle receipt of signals received via the antenna(s). In some environments, the communication interface can alternatively or also support wired communication and/or may alternatively support vehicle to vehicle or vehicle to infrastructure wireless links. The communication mediums may also be used to aid in position of a given end user/device.

In certain embodiments, the apparatus 10 can be equipped or associated with one or more positioning sensors 20, such as one or more GPS or GNSS sensors, one or more accelerometer sensors, one or more light detection and ranging (LiDAR) sensors, one or more radar sensors, one or more gyroscope sensors, and/or one or more other sensors. Any of the one or more sensors may be used to sense information regarding movement, positioning and location, and/or orientation of the apparatus for use, such as by the processing circuitry 12, in navigation assistance and/or autonomous vehicle control, as described herein according to example embodiments.

In certain embodiments, the apparatus 10 may further be equipped with or in communication with one or more camera systems 22. In some example embodiments, the one or more camera systems 22 can be implemented in a vehicle or other remote apparatuses. The camera systems 22 may include systems which capture both image data and audio data (via a microphone, etc.).

For example, the one or more camera systems 22 can be located upon a vehicle or proximate to it (e.g., traffic cameras, etc.). While embodiments may be implemented with a single camera such as a front facing camera in a consumer vehicle, other embodiments may include the use of multiple individual cameras at the same time. A helpful example is that of a consumer sedan driving down a road. Many modern cars have one or more cameras installed upon them to enable automatic braking and other types of assisted or automated driving. Many cars also have rear facing cameras to assist with automated or manual parking. In one embodiment of the current system, apparatus, method, etc. these cameras are utilized to capture images and/or audio of end users, vehicles, streets, etc. as an end user travels/moves around. The system, apparatus, etc. takes these captured images and/or audio (via the camera systems 22) and analyzes them along with other relevant data to determine a location of an end user on a certain street, area, etc. Images of end user communications may also be captured in some embodiments. It should be noted that various types of data such as end user location data and communication data/content may be detected via any functional means.

The data captured concerning an end user's location may also come from traffic cameras, security cameras, or any other functionally useful source (e.g., historic data, satellite images, websites, NFC data, etc.).

The analysis of the image data, audio data, and other relevant data concerning end user communications, location, etc. may be carried out by a machine learning model. This model may utilize any functionally useful means of analysis to identify end user location on a given roadway, road segment, building, or in a general area. The system, in this embodiment, may also examine relevant proximate points of interest (POIs), map objects, road geometries, animate objects, etc. which could suggest potential end user location information.

The locations of an end user, their vehicle, any relevant points of interest (POIs), and other types of data which are utilized by various embodiments of the apparatus may each be identified in latitude and longitude based on a location of the end user and their vehicle using a sensor, such as a GPS sensor to identify the location of the end user's device (e.g., smart phone, smart watch, tablet, etc.) and/or the end user vehicle. The POIs, map objects, infrastructure, etc. identified by the system may also be detected via the camera systems 22.

In certain embodiments, information detected by the one or more cameras can be transmitted to the apparatus 10, such as the processing circuitry 12, as image data and/or audio data. The data transmitted by the one or more cameras, microphones, etc. can be transmitted via one or more wired communications and/or one or more wireless communications (e.g., near field communication, or the like). In some environments, the communication interface 16 can support wired communication and/or wireless communication with the one or more system sensors (e.g., cameras, etc).

The apparatus 10 may also optionally include a user interface 18 that may, in turn, be in communication with the processing circuitry 12 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory 14, and/or the like).

Turning to FIG. 2, the map or geographic database 24 may include various types of geographic data 240. This data may include but is not limited to node data 242, road segment or link data 244, map object and point of interest (POI) data 246, end user data records 248, or the like (e.g., other data records 250 such as geopolitical border data, regulatory compliance data, traffic data, sidewalk data, etc.). Other data records 250 may include real time and historical data on geopolitical data including border locations (past and present) as well as the type of border. The other data records may also include regulatory compliance data such as which geopolitical regions/areas enforce which data, encryption, or privacy standards (e.g., the GDPR, etc.) and also data concerning regulations on certain types of data transmission, media, and even regulations on certain types of computerized communications (use of some applications for certain purposes may be restricted in some areas). Geopolitical areas may be any area which has disparate laws, rules, regulations, etc. as compared to one or more other areas. This includes states, countries, emirates, kingdoms, supra-national political and economic unions (e.g., EU, MERCOSUR, etc.) and regions within them.

In one embodiment, the following terminology applies to the representation of geographic features in the database 24. A "Node"—is a point that terminates a link, a "road/line segment"—is a straight line connecting two points, and a "Link" (or "edge") is a contiguous, non-branching string of one or more road segments terminating in a node at each end. In one embodiment, the database 24 follows certain conventions. For example, links do not cross themselves and do not cross each other except at a node. Also, there are no duplicated shape points, nodes, or links. Two links that connect each other have a common node.

The map database 24 may also include cartographic data, routing data, and/or maneuvering data as well as indexes 252. According to some example embodiments, the road segment data records may be links or segments representing roads, streets, or paths, as may be used in calculating a route or recorded route information for determination of one or more personalized routes. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The map database 24 may be maintained by a content provider e.g., the map data service provider and may be accessed, for example, by the content or service provider processing server. By way of example, the map data service provider can collect geographic data and dynamic data to generate and enhance the map database and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The map database 24 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map database 24 may be a master geographic database, but in alternate embodiments, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example. It should be noted the map database 24 may also include data regarding the interiors of buildings, homes, offices, etc. to aid the system, apparatus, etc. in tracking end user location as the end user moves around one location or between locations.

The records for end user data 248 may include various points of data such as, but not limited to: end user location data (at a first location, second location, etc.), end user communication data, end user appointment data, end user driving profile data (e.g., driving tendencies, etc.), data concerning a user's typical travel routine, and other end user data useful for determining if an end user will likely approach or enter a geopolitical area.

The end user location data may, in some embodiments, include data obtained from GNSS, GPS, NFC, Wi-Fi™ triangulation, cellular tower information, micro-mobility data, image data of the end user, facial and gait recognition (GRT) information, radio map data, etc. It should be noted that throughout this disclosure, end user location data may include location data of an end user and/or their end user device(s). In some situations, it may be more useful to track end user location generally or track specific location of an end user device or devices.

End user communication data may include information from SMS, MMS, email, social media, messaging apps, workplace applications like Slack, Microsoft Teams, Outlook, etc.

End user appointment/reservation/event data may, in some embodiments, include data about appointments, business or social meetings, events, reservations, etc. Scheduling information may come from scheduling software and websites such as Google Calendars, Outlook, Smartphone Calendars, HubSpot, Setmore, SimplyBook, Square Appointments, Appointlet, Doodle, Calendly, Acuity Scheduling, Calendar Hero. Restaurant reservation information may be obtained from website/tools like Resy, Wisely, Tock, and OpenTable. Event data for concerts, sporting events, social gatherings, etc. may be obtained from Ticketmaster, SongKick, etc. Event information may also be obtained from any relevant websites or databases.

End user driving profile data such as end user driving patterns (e.g., cautious, slow, fast, etc.) may be obtained by any functional manner including those detailed in U.S. Pat. Nos. 9,766,625 and 9,514,651, both of which are incorporated herein by reference.

FIG. 3A is a flowchart which demonstrates how the apparatus 10 identifies an end user's location. More, fewer, or different acts or steps may be provided. At a first step (block 30) the apparatus may obtain one or more pieces of GNSS data, images, audio, or other data of at least one end user. This data may be obtained from an end user device via positioning system(s), the camera of a device, or other means commonly found in an end user device such as a smart phone. Data may also be obtained from various programs, apps, websites, etc., running on said end user device such as location guidance apps (e.g., Google Maps, Here We Go, etc.), messaging apps, social media networks, scheduling applications and/or data, etc. Data may also be captured from the camera system of a vehicle or even traffic cameras, security cameras, etc. The apparatus may be trained to analyze the data (see FIG. 3C) via machine learning model or any other functionally capable means to identify/predict the end user's location at a given time and thus their likelihood of being within or proximate to a certain geopolitical location, area, etc.

The data captured by the system may include but is not limited to location GNSS/GPS data, the content and context of end user electronic communications, metadata about an end user, actual images or audio data of end users in various contexts (e.g., within their home or office, approaching their vehicle, in their vehicle driving towards a border, etc.). The presently disclosed system, apparatus, etc. may monitor, track, etc. the location of an end user at various locations throughout their day, when they travel outside a predefined area, etc.

For example, if an end user makes an appointment on a given day in a certain area (Germany for example), the end user's presence ten, one hundred, or one thousand miles away from the location of the appointment made on the day in question could impact the chances they will be attending said appointment. With this in mind, in some embodiments, the presently disclosed apparatus 10 might check the location of an end user on the day before their appointment and the day of their appointment. If the end user is within an acceptable range of the appointment (e.g., within the borders of Germany) the apparatus 10 might discern there is a need to comply with local German privacy regulations and use a suitable internet access point to comply with these regulations. This is one example of how the system might determine the location of an end user (block 32).

Once the end user's location has been identified, the apparatus may then identify one or more geopolitical areas (block 34) which the end user is traveling within or towards. The identification of the relevant geopolitical areas may be done via an end user device and/or vehicle's onboard GPS (see FIG. 1) or any other functional means. Once an end user location has been identified as within or close to a given geopolitical area, region, state, etc. the apparatus may then update one or more device or software settings (block 36) to comply with local regulations. This setting data can be used by various end users, including other travelers who want to comply with local regulations.

The location where the update of one or more settings to comply with local laws took place may be recorded by the apparatus. The data recorded may include but is not limited to identifying/associating locations of the identified geopolitical areas/borders with certain road segments and then providing a data indicator or flag to mark that road segment or attribute (metadata) that can be used as an identifier when needed to access or retrieve the road segments for various navigation functions. This data can also be used to generate alerts and analyze other similarly situated road segments for the potential device setting changes, route changes, etc. The road segment data may also include sidewalk data or areas included in/associated with the road segment records or the road segment records may represent path records such as sidewalks, hiking trails, etc. For example, the apparatus 10 might determine that everyone crossing the German border from France changes certain data privacy settings and connects to a different host URL for a given app. The apparatus 10 may then automatically (or manually with prompting) change the settings to comply with local German law as any end user crosses the German border (confirmed by GNSS data, camera image data, etc.)

Turning to FIG. 3B, the apparatus 10 may support a user interface 18 (as shown in FIG. 1). More, fewer, or different acts or steps may be provided. At a first step, the user interface may receive an input of destination from an end user (block 38). This input of destination may be received via an end user device graphical user interface (GUI) running upon a smartphone, tablet, integrated vehicle navigation system, etc. Once a destination is input, the apparatus may then access a geographic database (block 40) and determine a route to the input destination (block 42). The determined route may, in some embodiments, avoid (or select) at least one road segment in response to a determined geopolitical area interaction indicator. As mentioned above, the determination of the indicator may be based on any functionally capable means including identification of an end user in one or multiple locations (e.g., at home, a car, approaching a border) and predicting the future end user location(s) based on world/life events, end user communications, and/or various other data sources.

Notwithstanding how the apparatus generates a determination of an geopolitical interaction indicator, this information may then be used to route an end user towards or away from certain road segments when generating a route. The route determined by the apparatus 10 may then be displayed to the end user (block 44) via the same or a different user interface. The apparatus can take any number of additional actions (or in place of) what is called for in block 44. For example, the apparatus may provide audio guidance instead of a visual display. The navigation instructions may also be provided to an autonomous vehicle for routing (for example, without any display to the user). It should also be noted the UI can be run by a processor and stored upon one or more types of memory in some embodiments.

An example of the above embodiment would be that of an end user approaching a border. Not all borders are well marked nor is it typically outlined what privacy settings, etc. must be utilized upon entering a given state, country, or other area. Based on data in one or more geographic databases, the apparatus 10 may determine that the border being approached by an end user (on foot, in the air, in a car, bike, etc.) has different laws governing data, privacy, etc. From this, the apparatus 10 may choose to route the end user away from crossing the border or generate a route which provides the end user with time to adjust their device settings to comply with local laws. For example, an automated vehicle might pull over to the side of the road close to a given border and alert the end user to update their device settings to comply with local laws.

Referring now to FIG. 3C, the operations performed, such as by the apparatus 10 of FIG. 1, in order to train a machine learning model to detect and/or predict geopolitical area interaction indicators. More, fewer, or different acts or steps may be provided. As shown in block 45, the apparatus 10 includes means, such as the processing circuitry 12, memory 14, the communication interface 16 or the like, for providing a training data set that includes a plurality of training examples. In this regard, the training data set may be provided by access by the processing circuitry of the training data set stored by the memory. Alternatively, the training data set may be provided by access by the processing circuitry to a database 24 or other memory device that either may be a component of the apparatus or may be separate from, but accessible to the apparatus, such as the processing circuitry, via the communication interface. It should be noted the system apparatus may utilize more than one machine learning model to carry out the steps described herein.

In accordance with an example embodiment, the apparatus 10 also includes means, such as the processing circuitry 12, the memory 14 or the like, configured to train a machine learning model utilizing the training data set (block 46). The machine learning model, as trained, is configured to detect and predict geopolitical area interaction indicators. The prediction may be based, at least in part, upon end user location data (obtained from GNSS, etc.). This data may also be obtained from a conversation engaged in by at least one end user upon an end user device such as a smartphone, tablet, computer, etc. in some embodiments. For example, an SMS message which states "I am headed to France later today" could be analyzed by the apparatus 10 to establish a geopolitical area interaction indicator which can then be bolstered or confirmed by GNSS data.

The apparatus 10, such as the processing circuitry 12, may train any of a variety of machine learning models to identify indicators based upon a single or plurality of data points, images, audio, etc. Examples of machine learning models that may be trained include a decision tree model, a random forest model, a neural network, a model that employs logistic regression or the like. In some example embodiments, the apparatus, such as the processing circuitry, is configured to separately train a plurality of different types of machine learning models utilizing the same training data including the same plurality of training examples. After having been trained, the apparatus, such as the processing circuitry, is configured to determine which of the plurality of machine learning models predicts interaction indicators with the greatest accuracy. The machine learning model that has been identified as most accurate is thereafter utilized.

In one example, the machine learning model may be a deep learning neural network computer vision model that utilizes user location data, communication data, scheduling data, etc. to automatically identify geopolitical area interaction indicators. A training example for this first machine learning model may include data demonstrating known travel patterns, routines, etc. for end users. For example, if an end user has a typical travel routine for work (Monday-Friday) such as driving to an office building in France (or other POI(s)) each day and then driving home later in the day to Germany the machine learning model can be provided this set of location data to act as baseline for the location of an end user. The crossing of the Germany/France border each day might require setting changes for various apps and thus the travel routine is used to establish one or more geopolitical area interaction indicators (which in turn may be used to automatically update the needed software settings, etc.).

Additionally, if an end user then has to travel out of the EU on a given Tuesday, the model will be able to detect the departure from the normal travel routine based on the new location data of the end user and update various device and software settings automatically based on the appropriate matching settings stored by the apparatus 10.

Content of discussions (e.g., SMS data) and other data (e.g., Outlook scheduling data) may also be categorized and utilized by some models. For example, discussions about topics like travel, life events, etc. may indicate a given end user may be approaching or within a certain geopolitical area. These various types of discourse and metadata about them may be provided to the machine learning model to train and improve its accuracy.

In some example embodiments, a balance or trade-off between the accuracy with which the indicators are identified and the efficiency with which the machine learning model identifies them is considered. For example, a first set of data, images, audio, etc. may produce the most accurate identification, but a second combination of data, images, audio, etc. may produce an identification of indicators (e.g., GNSS data, image data, scheduling data.) that is only slightly less accurate, but that is significantly more efficient in terms of its prediction. Thus, the second combination of data that provides for sufficient, even though not the greatest, accuracy, but does so in a very efficient manner may be identified by the apparatus 10, such as the processing circuitry 12, as the preferred data about end users to be provided to the machine learning model to identify indicators in subsequent instances.

In some embodiments, a training example also includes information regarding a map object, such as a map object that is located at the location at which the data concerning end user communication was captured. One example of a map object is a bridge, and another example of a map object is a railroad crossing or median. A wide variety of other map objects may exist including, for example, border walls/fences, manhole covers, transitions between different types of road surfaces, medians, parking meters, various forms of infrastructure, or the like. As described in more detail below, the map object that is included in a training example may be determined or provided in various manners. For example, the map object may be defined, either manually or automatically, by reference to a map database 24 and identification of a map object at the same location or at a location proximate, such as within a predefined distance of, the location at which the corresponding image data was captured. The training example may also include point of interest (POI) data. A POI may be something like a border checkpoint, hospital, restaurant, park, school, bus stop, etc. Relevant POIs may also be defined, either manually or automatically, by reference to a map database 24 and identification of a POI at the same location or at a location proximate, such as within a predefined distance of, the location at which the corresponding image data was captured. The location of relevant POIs and/or map objects may be found by GPS coordinates or any other functionally capable means.

Yet other various types of data may also be utilized when training the machine learning model including map geometry data, historic data, indoor mapping data, geolocation data, Wi-Fi™ mapping (e.g., triangulation) data, hotspot data, etc. Ground truth data may also be utilized with a combination of these different features for supervised machine learning.

It should also be noted in some examples the apparatus, system, etc. may monitor both sides of a conversation. As mentioned above, the apparatus may examine one end user's inputs, posts, text messages, etc. to determine their present or future location. In some embodiments, the apparatus may monitor and analyze this same data (and other information) for one or more additional end users to determine if any other end user, engaged in a conversation with the first end user, may influence or create geopolitical area interaction indicator(s).

Once trained, the machine learning model may then be provided various real-world data as mentioned in block 47 and used to determine geopolitical area interaction indicators (which may also be described as area interaction indicators, geopolitical indicators, etc. in some embodiments) based on the various data points above and others (block 48).

An example of the apparatus 10 detecting and/or predicting a geopolitical area interaction indicator is that of an end user receiving bad news about a family member. The end user may receive a text from their parent stating "Aunt May is Sick!". The apparatus 10 may observe the actual content of the text message and compare it to one of more databases of known communications to determine if this message has the potential to create or impact on end user location. The system may also observe the end user's response to the message. For example, if the end user responds: "On my way to Aunt May's house in Dublin, Ireland!" there is an indication that this conversation is altering the end user's plans for the day as well as their potential location.

The end user's location may also be tracked and confirmed by the apparatus 10 using only GNSS data, etc. depending on the situation (SMS message content analysis is not needed in every case). Since the end user has indicated in their text message that they are headed to their family member's house in Ireland the apparatus 10 may combine this observation with their current location (in Belfast, Northern Ireland) to conclude that the end user might be headed to Ireland from Northern Ireland (thus crossing a border). Their location may be confirmed by GPS data, geographic database, etc. and thus the determination based on at least one end user location, one end user communication, and end user scheduling data may serve as an indicator of likely interaction with a geopolitical area (e.g., Ireland).

After receiving the SMS text message above, the end user may then approach and enter a vehicle. The apparatus 10 may keep track of the end user by way of geolocation data, image data of the end user entering a vehicle captured by a camera system, an end user device pairing with vehicle Bluetooth® or Wi-Fi™ of a vehicle, etc. As the end user drives their vehicle (e.g., a car) down a given road link, the apparatus 10 may continue to observe the end user to determine if the end user is traveling towards the airport or the Northern Irish border. The apparatus 10 may achieve this by any functional means including continuing to monitor GNSS data at various time intervals, etc.

The apparatus 10 may also continue to monitor GPS location information, text messages, social media posts, etc. to update the determined geopolitical are interaction indicator.

The machine learning model in this example makes its determination based on a combination of specific factors (map data, communication data, image data, location data, scheduling data, etc.), and the model predicts the potential of entering a given geopolitical area because of specific factors in a specific combination or configuration are present. The factors in this example may include data extracted from the text sent to an end user, the end user's physical location at various times (e.g., at least a first time), image data of the end user leaving their home and entering a vehicle, image data of roadways, as well as time of day data, historic data, etc. This set of data, provided to the model, matches (or is like) the factors used in the training process (in this example). This allows the machine learning model to predict if an end user is likely to cross a border or other geopolitical boundary at a given location based on the end user's current and/or past locations, time of day, etc.

The apparatus 10 may also use various events to trigger obtention of end user or device location. These might include but are not limited to a series of predefined time intervals, on end user demand, on application invocation/start up, or upon powering on of an end user device. Obtention of the first location of an end user device may also be triggered by change of cell tower or change of mobile network the end user device is connected to or a change in the Wi-Fi™ access points detected by the end user device.

The determination of one or more geopolitical area interaction indicators can then be utilized in various ways. The apparatus 10 may alert end users via graphical user interface that they could be crossing a border and need to update their device settings. The apparatus 10 might also automatically update one or more software or device settings to connect to the appropriate URL for a hosted solution within a geopolitical area, utilize with correct data encryption, etc. The apparatus 10 may also update one or more map layers and/or databases to account for this determination and use these entries to update settings for a given end user or other end users automatically in the future. It should be noted end users of the apparatus 10 might be human end users, automated devices, software clients, etc. In some embodiments, the data from the apparatus 10 may also be integrated into one or more other software solutions/services.

As mentioned before, the apparatus 10 features one or more machine learning models. This model and other data may be used by the apparatus 10 to not only analyze real time driving situations as mentioned above but also examine existing map data to identify other similarly situated roadways. These similar roadways will have similar POIs, map objects, etc. So, for example, if there was a roadway with which leads to a border crossing which users typically navigate, the apparatus 10 may be able to detect similar roadways in other areas by border crossings and provide alerts, settings updates, route guidance, etc. to another end user.

Turning to FIG. 4A, some of the examples discussed above are illustrated. Specifically, an end user 52 is shown exiting their home 50 and approaching their sedan 56. As shown in FIG. 4A, the end user 52 is utilizing the apparatus 10 upon their end user device 54 to detect and/or predict geopolitical area interaction indicators. The apparatus 10 identifies the user's location (moving from house to car) via GNSS data and/or images from a camera system 22 (or other security cameras, traffic cameras, etc.) and feeds those images into the machine learning model along with other data such as information concerning if the end user has any upcoming appointments and their potential location in the near future (potentially obtained from electronic conversations/interactions, scheduling data, etc.). The apparatus then takes this data along with relevant other information such as POI or image data of roads in the area, etc. and feeds all the data to the machine learning model (or to another model, algorithm, etc.) to determine if the given end user will likely be approaching or crossing into any new geopolitical areas (and if this new geopolitical area will require software setting changes).

It should be noted that the sedan 56 in this example may represent any vehicle. Such vehicles may be standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one embodiment, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

In one embodiment, a graphical user interface (GUI) may be integrated in the vehicle, which may include assisted driving vehicles such as autonomous vehicles, highly assisted driving (HAD), and advanced driving assistance systems (ADAS). Any of these assisted driving systems may be incorporated into the GUI. Alternatively, an assisted driving device may be included in the vehicle. The assisted driving device may include memory, a processor, and systems to communicate with the GUI. In one embodiment, the vehicle may be an HAD vehicle or an ADAS vehicle. An HAD vehicle may refer to a vehicle that does not completely replace the human operator. Instead, in a highly assisted driving mode, a vehicle may perform some driving functions and the human operator may perform some driving functions. Such vehicle may also be driven in a manual mode in which the human operator exercises a degree of control over the movement of the vehicle. The vehicle may also include a completely driverless mode. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In this example, the end user 52 lives in Ireland has an appointment in Belfast, Northern Ireland the following day. The apparatus 10 may obtain various pieces of data about the appointment such as the scheduled time/date, the exact location, and various other pieces of data and/or metadata such as the importance of the appointment. The importance of the appointment data might be indicated by an end user manually or automatically detected by the apparatus 10 via machine learning or any other functionally capable means. For example, a surgical appointment or doctor's appointment might be given more weight/importance than a haircut appointment or dinner reservation. The importance of the appointment might, in some embodiments, influence the likelihood of an end user traveling to a given geopolitical area and thus produce or enhance a geopolitical interaction indicator.

In some embodiments, the apparatus 10 may extract information from the communications of an end user by use of OCR and/or NLP. In one embodiment, the apparatus 10 may use optical character recognition ("OCR") in conjunction with one or more databases (see FIG. 2) to determine text or characters of a message. Additionally, the apparatus 10 may compare features or components (such as invariant components relating to an emoji) in or from images to reference features or components in one or more reference databases (or data libraries) to detect a symbol or feature (such as angry emojis, exclamation points, etc.). The apparatus 10 may then record (in a database) the determined text, the identified symbols and/or graphics thereof, and/or other features or determinations. For example, the end user 52 may be typing on their device 54 as they walk to their car a phrase such as "I am headed out of the country from Dublin airport to Mexico for the long weekend". The apparatus 10 can extract this text along with any exclamation points, emojis, etc. and use this information to determine the message's meaning and content, at least in part, by comparing the message's content to a current database of reference information.

As mentioned above, OCR may be used to extract the information from an end user message and natural language processing (NLP) technologies may be used in conjunction with the OCR tools to aid the apparatus 10 in analyzing the messages. NLP may be used in some embodiments to address issues around word segmentation, word removal, and summarization to determine the relevancy of the various parsed data. In various embodiments, semantics of the various parsed data are determined based on a vocabulary model in a grammar module. For example, in various embodiments, probabilistic latent semantic indexing (pLSI) or Latent Dirichlet allocation (LDA) may be used to deduce semantics from words in the extracted message information and determine the information's relevancy. Such methods can be used to derive text and topics from a set of predefined terms.

Based off this information, the apparatus may provide to the end user 52 feedback. In some embodiments, this feedback might be computerized instructions which cause one or more software programs and/or devices to change one or more settings which comply with local geopolitical regulations. This could be data privacy settings, encryption settings, data formatting, switching from connecting to one hosted solution versus another (e.g., different versions of Facebook hosted in different countries around the world), etc. The feedback might also be an alert (e.g., risk of current settings not complying with local laws). The information may also be used to provide route guidance to avoid certain areas. Alerts, settings updates, and routing information may also be provided to other user(s) in the area.

The feedback generated may also be used to select both preferred regional credentials and a regional internet service endpoint to comply with local laws. For example, if an end user travels across a border and is conducting a cross-border data transfer—the appropriate regional credentials and a regional internet service endpoint should be used to transmit the data, while other regional credentials and a regional internet service endpoint may need to be used to receive/output the data. Some embodiments of the present apparatus 10 may accommodate cross-border data transfers by selectively using the regional credentials (from a predefined data set for a given geopolitical area) which match a user's current physical location as confirmed by GNSS data, radio map data, image data, etc.

Route guidance may include various guidance options, visual and/or audio. For example, visual guidance on how and when to change lanes or audio guidance relaying the same information. Automatic driver controls like those for an autonomous vehicle (e.g., an automatic lane change that can include an explanation to the passenger on what is happening), etc. The guidance itself can include the alert messages as mentioned above so the generation of alerts and route guidance can be the same function. When calculating the route and route guidance, metadata such as a data flag or attribute of road segments may be taken into consideration when forming different suggested routes and one or more segments may be excluded from these routes when it is determined (by the apparatus) that one or more geopolitical interaction area indicators are associated with the omitted segment(s).

In some embodiments, apparatus 10 may generate a confidence interval/score which reflects the likelihood an end user will interact with or enter a given geopolitical area. In the example above, the apparatus 10 can detect an end user communication and extract relevant information such as the end user's weekend plans to be out of their typical location (in Mexico instead of Ireland). From this information, the confidence score for the likelihood of an end user interacting with a new geopolitical area (e.g., Mexico) may be set a 1. The apparatus 10 may then receive additional information from other sources (e.g., ongoing updates to end user location data, metadata about the conversation, flight information, traffic camera data, traffic alerts, real-time driving behavior of the end user, etc.) which can increase or decrease this confidence score. For example, if there a flight delay, data concerning this when provided to or captured by the apparatus 10 might lower the confidence score for the from 1 to 0.75. If the end user's flight is canceled, the score might be reduced to 0.25 or even 0.

It should be noted that the confidence interval/score described above may itself act as a geopolitical area interaction indicator and/or may also be used as part of a greater analysis and combined with other factors when determining likelihood of interaction with a new geopolitical area.

FIG. 4B illustrates another example embodiment. Specifically, the sedan 56 from FIG. 4A is shown driving down a roadway 60. As shown in FIG. 4B, the sedan 56 is utilizing the apparatus 10 to adjust device settings in response to one or more geopolitical area interaction indicators. The apparatus 10 identifies the sedan 56 based on the information discussed above and feeds the GNSS data, images, etc. into a machine learning model which determines the likelihood the end user driving the sedan 56 will enter a different geopolitical region. In this example, the end user is headed to an office building 74 along the roadway across a geopolitical border 76. The end user is navigating to the building by use of a GPS navigation system which is proving routing information 72. Since the routing information is guiding the end user across the border 76, the apparatus 10 may detect this crossing and when the end user gets close or actually crosses the border 76 (confirmed by GNSS data, car camera systems, security cameras, etc.) the apparatus may then produce one or more types of feedback (discussed above) to account for local regulations.

FIG. 5A illustrates another example embodiment. As shown, a mobile device 80 such as a smartphone or tablet may run one or more software clients 82 upon the device. These software clients may, in some embodiments, directly connect to an external regional discovery service application programming interface (RDS API) 84 which in turn communicates with the regional discovery service (RDS) servers 86. The RDS, as described above, my enable the software clients to update settings and select an appropriate regional internet service endpoint when the mobile device 80 has entered or is approaching a geopolitical area which requires such changes to be made.

FIG. 5B illustrates yet another example embodiment. As shown, a mobile device 80 such as a smartphone or tablet may run one or more software clients 82 upon the device. These software clients may, in some embodiments, communicate with a RDS module 88 stored locally on the device 80. This local RDS module 88 will then communicate with external regional discovery service (RDS) servers 86. Such a configuration may be preferable in some situations, namely where connection to an external API is not available or allowed.

The RDS may find the current geopolitical region (e.g. country or a union of countries, etc.) by use of the mobile country code (MCC) of the cellular network to which the mobile device is currently connected (or attempting to connect to), and then match the observed MCC code to a geopolitical region. Such information may be stored in one or more databases as discussed above in this disclosure. A software client can then select the appropriate regional credentials and regional service endpoint name to use within a given geopolitical area.

In another embodiment, the RDS may make use of one or more Geographical Domain Name System (GeoDNS) which, upon receiving a DNS query from a mobile device, matches mobile device's client IP address against a corresponding country, and then returns region information. This information may be returned as a TXT record. This TXT record may contain the name of the region, country, etc. The record may also include domain name of the regional service endpoint or URL of the regional service endpoint as well as other useful information. The software client can then match this information (from the RDS) to the appropriate/permissible regional credentials and regional service endpoint name.

In yet another embodiment, the RDS apparatus may use an end user's current GNSS based location estimate, or if such is not available or not preferred, current location estimate from a network positioning service (based on Wi-Fi™ signals, BLE signals, etc.). If current location estimate is not available, the RDS may use latest known location estimate (if it is recent enough, for example within the last hour), and then use geographic polygon matching or a similar technique to predict the current geopolitical region a device is within based on the obtained location estimate. With this information, the software client can then select the appropriate regional credentials and regional service endpoint name.

It should be noted that it is fully envisioned that over time regulations of countries or unions of countries change, hence the rules and service end points established for geopolitical regions may change over time. New geopolitical regions may appear, and existing geopolitical regions may disappear. To cope with these changes, the RDS apparatus utilizes updatable dynamic definitions of the relevant geopolitical regions and respective service endpoint addresses stored within internal or external databases/sources.

In the examples above, the apparatus may detect and predict the location of an end user and/or their end user devices (phone, tablet, computer, etc.). This may be important because in some situations, such as customs check points, checked baggage, etc. an end user and their device might be separated and thus the apparatus may track and predict the location of end users, their devices, or both when determining if settings, etc. need to be updated to comply the regional laws, etc.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks.

These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for providing a geopolitical region discovery service comprising:
obtaining an indication of at least a first location of an end user device, wherein the first location of an end user device is captured at a dynamic time interval based on end user appointment data;
obtaining geopolitical compliance data for one or more geopolitical areas at the first location of the end user device or within a predefined distance from the first location of the end user device;
determining a geopolitical interaction indicator based, at least in part, on the obtained indication of the first location and the geopolitical compliance data for the one or more geopolitical areas proximate to the first location; and
generating at least one feedback for the end user device or a software client, wherein the feedback is used to adjust at least one privacy setting upon the end user device, the adjusted privacy setting corresponding to geopolitical compliance data for a geopolitical area.

2. The method according to claim 1, wherein the first location of the end user device is obtained at a predefined time interval, on end user demand, on application invocation, or upon powering on of the end user device.

3. The method according to claim 1, wherein obtaining the first location of the end user device is triggered by change of cell tower or change of mobile network the end user device is connected to or a change in Wi-Fi access points detected by the end user device.

4. The method according to claim 1, wherein the indication of the first location is obtained from at least one electronic communication.

5. The method according to claim 1, wherein the indication of at least the first location of the end user device is based at least in part on a mobile country code.

6. The method according to claim 1, wherein the indication of at least the first location of the end user device is based at least in part on a Geographical Domain Name System.

7. The method according to claim 1, further comprising generating an alert in response to the determined indicator.

8. The method according to claim 1, further comprising utilizing the feedback generated to select appropriate regional service credentials or a regional service endpoint.

9. An apparatus, the apparatus comprising at least one processor and at least one memory storing computer program code, the at least one memory and the computer program code configured to, with the processor, cause the apparatus to at least:
obtain an indication of at least a first location of an end user device, wherein the first location of an end user device is captured at a dynamic time interval based on end user appointment data;
obtain geopolitical compliance data for one or more geopolitical areas at the first location of the end user device or within a predefined distance from the first location of the end user device;
determine a geopolitical interaction indicator based, at least in part, on the obtained indication of the first location and the geopolitical compliance data for the one or more geopolitical areas proximate to the first location; and
generate at least one feedback for the end user device or a software client, wherein the feedback is used to adjust at least one privacy setting upon the end user device, the adjusted privacy setting corresponding to geopolitical compliance data for a geopolitical area.

10. The apparatus according to claim 9, wherein the first location of the end user device is obtained at a predefined time interval, on end user demand, on application invocation, or upon powering on of the end user device.

11. The apparatus according to claim 9, wherein the at least one memory and the computer program code are further configured to, with the processor, cause the apparatus to obtain the indication of the first location from at least one electronic communication.

12. The apparatus according to claim 9, wherein the at least one memory and the computer program code are further configured to, with the processor, cause the apparatus to obtain the indication of the first location from at least one mobile country code.

13. The apparatus according to claim 9, wherein the at least one memory and the computer program code are further configured to, with the processor, cause the apparatus to obtain the indication of the first location from a Geographical Domain Name System.

14. The apparatus according to claim 9, wherein the at least one memory and the computer program code are configured to, with the processor, cause the apparatus to generate or update data on the software client.

15. The apparatus according to claim 9, wherein the at least one memory and the computer program code are configured to, with the processor, cause the apparatus to select appropriate regional service credentials or a regional service endpoint based on the generated feedback.

16. A non-transitory computer-readable storage medium for geopolitical region discovery, carrying one or more sequences of one or more instructions which, when executed by one or more processors, cause an apparatus to:
obtain an indication of at least a first location of an end user device, wherein the first location of an end user device is captured at a dynamic time interval based on end user appointment data;
obtain geopolitical compliance data for one or more geopolitical areas at the first location of the end user device or within a predefined distance from the first location of the end user device;
determine a geopolitical interaction indicator based, at least in part, on the obtained indication of the first location and the geopolitical compliance data for the one or more geopolitical areas proximate to the first location; and
generate at least one feedback for the end user device or a software client, wherein the feedback is used to adjust at least one privacy setting upon the end user device, the adjusted privacy setting corresponding to geopolitical compliance data for a geopolitical area.

17. The non-transitory computer-readable storage medium of claim 16, wherein the at least one feedback generated is appropriate service credentials for connecting to a hosted service in a geopolitical region.

18. The non-transitory computer-readable storage medium of claim 16, wherein the first location of the end user device is obtained at a predefined time interval, on end user demand, on application invocation, or upon powering on of the end user device.

* * * * *